United States Patent
Singh et al.

(10) Patent No.: US 11,548,831 B2
(45) Date of Patent: Jan. 10, 2023

(54) OPTIMIZED BULK BLEND FORMULATION BASED ON COMPRESSIVE STRENGTH REQUIREMENTS

(71) Applicant: Halliburton Energy Services, Inc., Houston, TX (US)

(72) Inventors: John Paul Bir Singh, Kingwood, TX (US); Xueyu Pang, Tomball, TX (US); Krishna Babu Yerubandi, Houston, TX (US); Ronnie Glen Morgan, Waurika, OK (US); Thomas Jason Pisklak, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 319 days.

(21) Appl. No.: 16/632,474

(22) PCT Filed: Apr. 5, 2019

(86) PCT No.: PCT/US2019/026168
§ 371 (c)(1),
(2) Date: Jan. 20, 2020

(87) PCT Pub. No.: WO2020/204953
PCT Pub. Date: Oct. 8, 2020

(65) Prior Publication Data
US 2021/0171405 A1 Jun. 10, 2021

(51) Int. Cl.
*C04B 40/00* (2006.01)
*B28C 7/04* (2006.01)
(Continued)

(52) U.S. Cl.
CPC ............ *C04B 40/0032* (2013.01); *B28C 7/04* (2013.01); *B28C 7/0404* (2013.01); *C04B 14/06* (2013.01); *C04B 14/22* (2013.01); *C04B 18/027* (2013.01); *C04B 18/08* (2013.01); *C04B 28/04* (2013.01); *C09K 8/473* (2013.01);
(Continued)

(58) Field of Classification Search
CPC ............ C04B 40/0032; C04B 2201/20; C04B 2201/50; B28C 7/04; B28C 7/0404
See application file for complete search history.

(56) References Cited

U.S. PATENT DOCUMENTS 6,120,173 A 9/2000 Bonissone et al.
8,609,595 B2 12/2013 Morgan et al.
(Continued)

FOREIGN PATENT DOCUMENTS

WO WO-2018156115 A1 * 8/2018 ............. B28C 7/024
WO WO-2018156123 A1 * 8/2018 ............. C04B 18/08

OTHER PUBLICATIONS

ISRWO International Search Report and Written Opinion for PCT/US2019/026168 dated Jan. 3, 2020.
(Continued)

*Primary Examiner* — Crystal J. Lee
(74) *Attorney, Agent, or Firm* — Thomas Rooney; C. Tumey Law Group PLLC

(57) ABSTRACT

A method of designing a cement composition may include: minimizing an objective function subject to a plurality of constraints to produce a cement composition including at least one cement component and water; and preparing the cement composition.

20 Claims, 3 Drawing Sheets

(51) Int. Cl.
   *C04B 14/06* (2006.01)
   *C04B 14/22* (2006.01)
   *C04B 18/02* (2006.01)
   *C04B 18/08* (2006.01)
   *C04B 28/04* (2006.01)
   *C09K 8/473* (2006.01)
   *C04B 111/40* (2006.01)
   *E21B 33/13* (2006.01)

(52) U.S. Cl.
   CPC ....... *C04B 2111/40* (2013.01); *C04B 2201/20* (2013.01); *C04B 2201/50* (2013.01); *E21B 33/13* (2013.01)

(56) References Cited

U.S. PATENT DOCUMENTS

| | | |
|---|---|---|
| 11,078,400 B2 | 8/2021 | Pisklak et al. |
| 11,174,198 B2 | 11/2021 | Morgan et al. |
| 11,225,595 B2 | 1/2022 | Jimenez et al. |
| 2008/0000391 A1 | 1/2008 | Drochon |
| 2008/0009976 A1 | 1/2008 | Andersen et al. |
| 2008/0149337 A1 | 6/2008 | Kulakofsky et al. |
| 2010/0212892 A1* | 8/2010 | Santra .............. C09K 8/467 166/250.14 |
| 2017/0364607 A1 | 12/2017 | Kaushik et al. |
| 2019/0358853 A1 | 11/2019 | Morgan et al. |
| 2019/0367797 A1 | 12/2019 | Morgan et al. |
| 2020/0332172 A1 | 10/2020 | Pisklak et al. |
| 2020/0332643 A1 | 10/2020 | Pisklak et al. |
| 2020/0333318 A1 | 10/2020 | Benkley et al. |
| 2021/0172280 A1 | 6/2021 | Halliburton |

OTHER PUBLICATIONS

PCT Application No. PCT/US2019/026171 dated Apr. 5, 2019.
PCT Application No. PCT/US2017/018953 dated Feb. 22, 2017.
PCT Application No. PCT/US2017/018928 dated Feb. 22, 2017.

* cited by examiner

OPTIMIZED BULK BLEND FORMULATION BASED ON COMPRESSIVE STRENGTH REQUIREMENTS

BACKGROUND

In well cementing, such as well construction and remedial cementing, cement compositions are commonly utilized. Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A particular challenge in well cementing is the development of satisfactory mechanical properties in a cement composition within a reasonable time period after placement in the subterranean formation. Oftentimes several cement compositions with varying additives are tested to see if they meet the material engineering requirements for a particular well. The process of selecting the components of the cement composition are usually done by a best guess approach by utilizing previous slurries and modifying them until a satisfactory solution is reached. The process may be time consuming and the resulting composition may be complex. Furthermore, the cement components available in any one particular region may vary in composition from those of another region thereby further complicating the process of selecting a correct composition.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
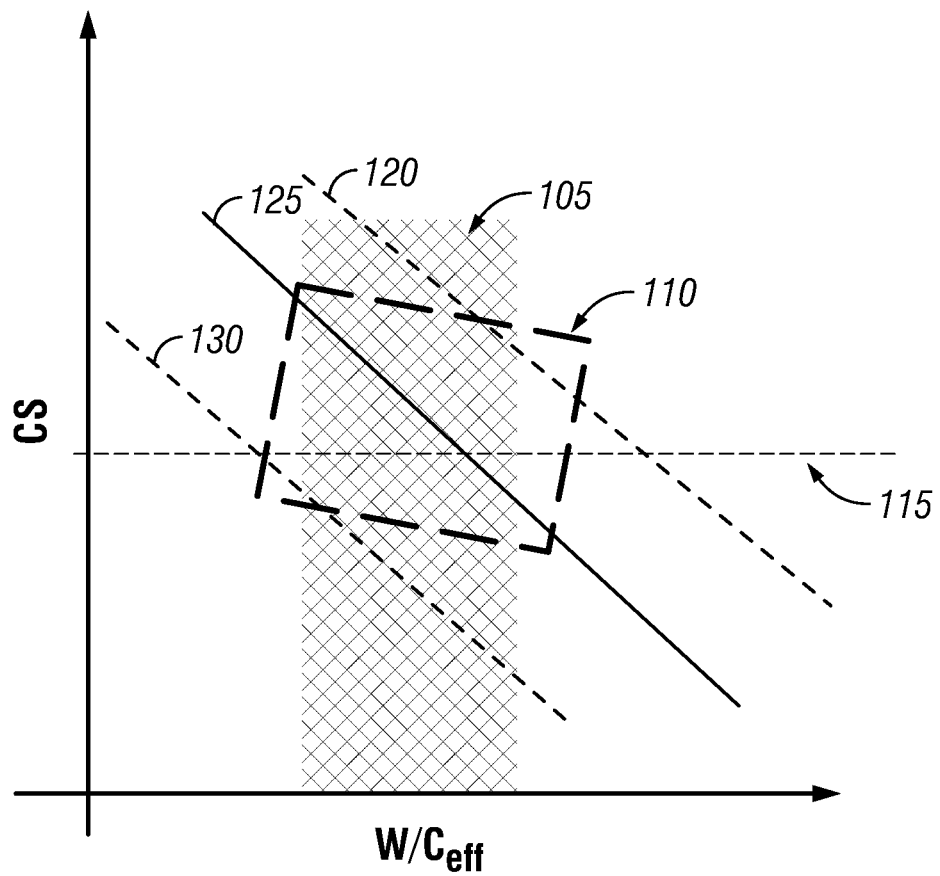
FIG. 1 is a graph illustrating a relationship between compressive strength, density, and mixability and stability for a cement composition.
Figure 2:
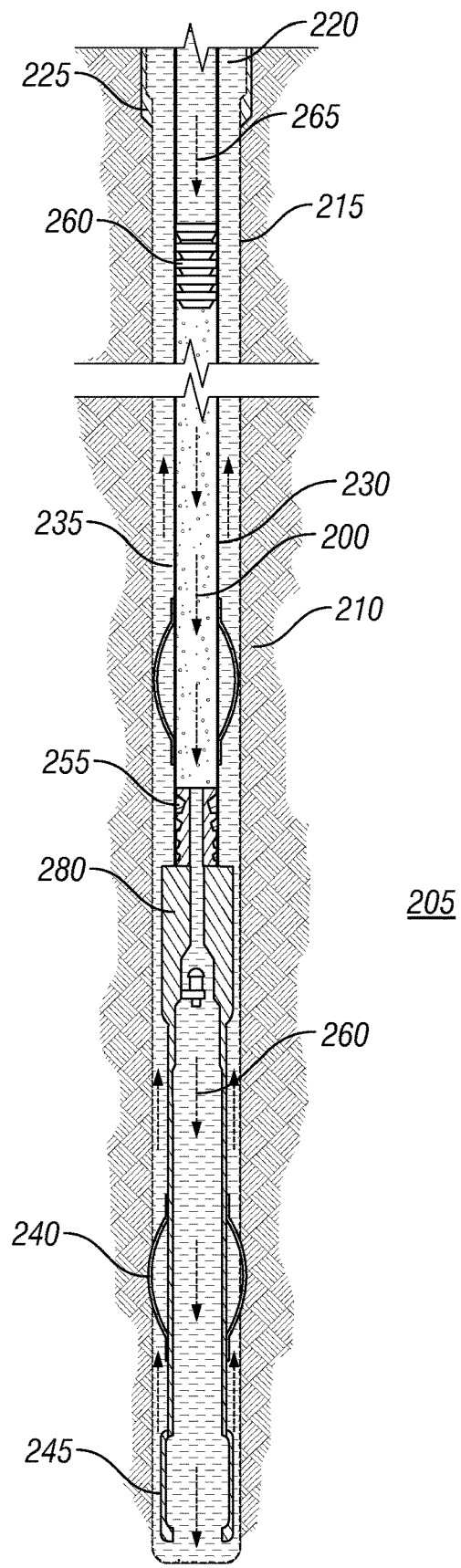
FIG. 2 is a schematic illustration of showing introduction of a cement composition into a wellbore.

The present disclosure may generally relate to cementing methods and systems. Provided herein are methods that may include designing cement slurries, sometimes referred herein as cement compositions, with optimized specific slurry properties including but not limited to total crystalline silica content, specific heat, thermal conductivity, heat content, total amount of lime, amorphous silica, alumina, and iron. The methods may include mathematical models and mathematical design constraints of cement slurries that allow one of ordinary skill in the art with the benefit of this disclosure to design a cement composition with optimized specific slurry properties including but not limited to total crystalline silica content, specific heat, thermal conductivity, heat content, total amount of lime, amorphous silica, alumina, and iron. The methods presented herein may be advantageous over traditional trial-and-error based cement composition design processes as the trial-and-error methodology, while generally effective at finding a workable cement composition, may be inefficient and time consuming and may result in a cement composition that has certain undesirable characteristics. Some undesirable characteristics may include number of components in the cement composition, concentrations of components in the cement composition, excessive compressive strength beyond engineering requirements. Further uses of the methods and systems described herein may be in automation of wellbore cement composition design.

The compressive strength of a cement composition may be correlated with a mass of water to mass of cementitious material ratio (w/c). In general, two dry blend cement compositions mixed with unequal amounts of water may exhibit different final compressive strengths. A cement composition prepared with relatively more water or a higher w/c ratio may have a lower final compressive strength than a cement composition prepared with relatively less water or a lower w/c ratio. The water to cement ratio also may affect the final density of the composition as adding additional water to a cement composition may lower the composition density while reducing the amount of water may increase the composition density. Composition density may be a design parameter for a cement composition as the composition density will affect the hydrostatic pressure exerted by the cement composition on a subterranean formation. Furthermore, while a theoretical amount of water to cement ratio may be proposed for a particular cement dry blend, the resulting cement composition produced from combining the water and dry blend cement may not be mixable and stable.

The term mixability refers to the ability of the components comprising the cement composition to blend to form the cement composition. The term "mixability" or the term "to blend" may generally refer to adequately wetting the surfaces of the dry particles of the cement blend when using a standard API RP 10B laboratory procedure for oil well cements. Cement slurries have a limited range of water that may be added to form what is referred to as a mixable composition. For example, if too little water is added, the components of the cement composition may not blend to form a composition but rather may stay in a relatively separate and non-hydrated state or the final mixture may be too viscous to pump. If too much water is added, the components of the cement composition may blend to form a composition, but a free water phase may separate from the bulk composition.

In the case of too little water, the cement composition may not set to form a hardened mass with satisfactory physical properties. If placed in a subterranean well, such a cement composition may fail over time resulting in cracks or micro annuli forming between the casing and cement sheath or between the cement sheath and the subterranean formation. The cracks or micro annuli may allow fluid invasion therein which may require remediation. In extreme cases the cement may fail in a manner leading to a loss of well control. In the case of free water separation, fluid separation may occur at the top of the cement column or in pockets in deviated (e.g. horizontal) wells. In the case of unconventional long horizontal wells, such as but not limited to lengths exceeding 1,000 ft, slurries may become unstable resulting in separation of the composition components resulting a non-homogeneous mixture characterized by free water and an uneven distribution of particulate content. Uneven particulate distribution may result in the particles settling and thus potentially plugging off most or all of the annular cross section, resulting in excessive pumping pressure at the surface. This ultimately results in not being able to complete the cement placement, and hence leaving large portions of the targeted annular space without adequate isolation. These pockets may contribute to annular gas leakage and other annular flow problems. Furthermore, large amounts of free water in a deviated well might lead to a communication channel on the high side in the well bore. These channels may cause gas inflows or undesirable cross flows into the well. If such conditions are allowed to persist, a buildup of annulus pressure which may require intervention. Furthermore, pockets in the cement sheath may present a point of increased casing corrosion which may lead to holes in the casing, casing collapse, loss of well control, and/or abandonment of the well.

FIG. 1 is a graph illustrating a relationship between compressive strength, density, mixability, and stability for a cement composition. FIG. 1 is an illustrative example of cement composition design that has a minimum and maximum composition density and a minimum compressive strength requirement. The water to cement ratio is the horizontal axis in FIG. 1 shown as $w/c_{eff}$ or the effective water to cement ratio adjusted for reactivity of the cement components. In FIG. 1, shaded area 105 illustrates an upper and lower range of composition density design for the cement composition. The leftmost edge of shaded area 105 corresponds to the lowest value of $w/c_{eff}$ and therefore highest composition density and the rightmost edge of shaded area 105 corresponds to the highest value of $w/c_{eff}$ and the lowest composition density. One of ordinary skill in the art will understand how to establish upper and lower values for composition density design. The vertical axis of FIG. 1 is compressive strength. Horizontal line 115 is the minimum compressive strength required when the composition cures to form a hardened mass. Lines 120, 125, and 130 are models describing three cement dry blends mixed at various water to cement ratios and the corresponding compressive strength resulting from each. Superimposed over the lines 120, 125, and 130 is box 110 which illustrates where the cement dry blends are mixable and stable. For the specified compressive strength requirement and composition density design, it can be concluded that the cement dry blend corresponding to line 130 does not satisfy all conditions required of the composition. The dry blends corresponding to lines 120 and 125 each will possibly meet the engineering requirements of density and compressive strength. For the dry blends meeting the requirements, an objective function may be minimized and/or maximized to generate a cement blend that is optimized for a particular objective function. In some examples, the cement blend may be optimized for more than one objective function. Some non-limiting examples of objective functions may include, but are not limited to, compressive strength, density, operational efficiency, materials logistics, materials inventory, and specific slurry properties including but not limited to total crystalline silica content, specific heat, thermal conductivity, heat content, total amount of lime, amorphous silica, alumina, and iron, for example. In some examples, an optimum blend may be determined using the techniques described herein. Additionally, one of ordinary skill in the art, with the benefit of this disclosure, would be able to extend the models expressed in FIG. 1 to account for time and/or temperature evolution of compressive strength.

Objective functions may have a variety of constraints, including but not limited to a minimum compressive strength, density range, stability, and mixability to be considered a suitable composition for use in wellbore applications. There may be other constraints on the objective function such as time and/or temperature dependent compressive strength development, pump time, fluid loss, and other requirements one of ordinary skill in the art will readily recognize. To produce a cement composition with desired properties, an objective function may be minimized or maximized based on constraints. For example, an objective function may be minimized or maximized based at least in part on compressive strength, density range, stability, and mixability as these factors are may set the minimum requirements for a cement composition to be viable for use. Equation 1 illustrates the constraint of compressive strength i.e. that the compressive strength of the composition should be greater than a required compressive strength.

$$CS = CS_0 \exp\left(-\frac{w}{c_{eff}}\right) \geq CS_{req} \qquad (1)$$

In equation 1, CS is compressive strength of the composition, $CS_0$ is compressive strength of the composition when the water to cement ratio is 1, $c_{eff}$ is the effective cement adjusted for reactivity differences between the components of the cement composition, and $CS_{req}$ is the minimum required compressive strength of the cement composition. Equation 2 is the definition of $c_{eff}$.

$$C_{eff} = \Sigma \alpha_i C_i \qquad (2)$$

$$\Sigma C_i = 1 \qquad (3)$$

In equation 2, $\alpha_i$ is the reactive index of cementitious component i in the cement composition and $C_i$ is the mass fraction of cementitious component i in the cement composition. For all cementitious components, the mass fraction sums to unity as in equation 3.

Another constraint on an objective function may be upper and lower range of composition density. The composition density requirement is illustrated by equation 4:

$$\rho_{min} < \left(\rho = \frac{W + \Sigma C_i}{\frac{W}{\rho_w} + \Sigma \frac{C_i}{\rho_i}}\right) < \rho_{max} \qquad (4)$$

where W is the mass of water per unit mass of cementitious components in the cement composition, $\rho_w$ is the density of water, $C_i$ is the mass fraction of cementitious component i in the cement composition, and $\rho_i$ is the density of component i in the cement composition.

Another constraint on an objective function may be the amount of water to reach the lower limit of composition mixability and the maximum amount of water to reach the upper limit of composition stability. The lower limit of composition mixability may relate to the water requirement of each cementitious component in the cement composition. Water requirement may be defined for any materials present in a cement composition such as materials that dissolve as well as materials that do not dissolve. Some dissolvable materials may be solvated by water or by chemical reaction with water or other chemical species present in the composition and thereafter is solvated. Some common dissolvable materials may include cementitious materials, fluid loss additives, polymers, gums, and other cement components that are well known in the art. Additionally, materials that do not dissolve, such as plastic beads for example, may also exhibit a water requirement. Water requirement may be positive water requirement or negative water requirement. In the instance of a positive water requirement, the particular material requires water to be present to hydrate. An example of a material with a positive water requirement is Portland class H cement. Pure Portland class H cement without additives requires addition of water to become a cement composition capable of setting to form a hardened mass. Superplasticizers such as polycarboxylate ether dispersants may have a negative water requirement in that a polycarboxylate ether dispersant may reduce the water requirement that a Portland class H cement requires to become mixable.

Water requirement may be defined as the amount of mixing water that is required to be added to a powdered, solid material to form a composition of a specified consistency. The consistency may vary for a particular application. The following example technique for determining water requirement holds the consistency and amount of water constant while varying the amount of the solid material. However, techniques may also be applied that vary the amount of the water, the consistency, and/or the amount of solid material in any combination. The following technique also estimates the specified consistency based on the size of the vortex at the surface of the mixture in the blender. Water requirement for a particular cement component may be determined by a process that includes a) preparing a blender with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the cement component to the water; 4) observing mixture to determine if a specified consistency is obtained, for example, the cement component can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, add more cement component until desired consistency is obtained, for example, the vortex formed in the blender is about the size of a dime; and 6) calculate the water requirement based on the ratio of water to cement component to obtain the desired consistency. In some examples, the specific consistency may be where a vortex at the surface of the mixture in the blender is the size of a dime or about 0.7 in (17.9 mm). Other suitable techniques for determining the water requirement may also be used as will be appreciated by those of ordinary skill in the art.

Cementitious components such as Portland cement may have different water requirements depending on the origin of the cement components. There may be regional or manufacture variability in water requirement of cementitious components from differences in minerology of the cementitious material. For a given dry cement composition the total water requirement, or water required to wet all particles, may be calculated by a linear combination of the mass fraction of each component and the water requirement of each component in the dry cement composition by Equation 6. Dry cement composition or dry blend may refer to the components of a cement composition other than cement additives and water.

$$WR_{Blend} = \Sigma C_i WR_i \qquad (6)$$

In equation 6, $WR_{Blend}$ is the total water requirement expressed as mass of water per unit mass of dry cement required to hydrate all particles of the dry blend. $WR_{Blend}$ may be the minimum amount of water to mix the cementitious components to form a composition that is mixable. Ci is the mass fraction or mass of component i in the cement composition and $WR_i$ is the water requirement of component i in the cement composition. $WR_{Blend}$ may also be expressed in units of volume by converting mass to volume by water density.

In some examples, there may be synergistic effects between the components of the cement composition when blended to a composition. Some effects may reduce the water requirement of the blend while some effects may increase the water requirement of the blend. These synergistic mixing effects may be expressed by a non-linear equation such as Equation 7.

$$WR_{Blend} = \Sigma (C_i WR_i)^{B_i} \qquad (7)$$

Where $WR_{Blend}$ is the total mass of water required per unit mass of the dry cement composition, Ci is the mass fraction or mass of component i in the cement composition, $WR_i$ is the water requirement of component i in the cement composition, and $B_i$ is a material constant for component i. The material constant may be a measured property that may be acquired by laboratory analysis. For example, water requirements of individual materials and combinations of materials may be measured. A curve fitting scheme such as multivariate analysis or stepwise regression, for example, may then be applied to find B.

As discussed above, a cement composition prepared with a water volume over the water volume requirement of the particular cement dry blend may lead to a layer of water, sometimes referred to as free water or free fluid, to form on the cement composition. A cement composition where a free water layer is formed may be referred to as an unstable composition. Although the formation of a free fluid may generally be undesirable, each section of a wellbore to be cemented may have an acceptable amount of free fluid formation either defined by regulation, economics, or customer specification, among other factors one of ordinary skill in the art would readily recognize. The maximum water requirement ($WR_{max}$) is therefore typically provided as a design parameter that does not necessarily need to be calculated for the particular wellbore section to be cemented. For example, in a conductor casing or a surface casing cement, a relatively larger amount of free fluid may be allowed as compared to a horizontal casing cement. In some applications, no amount of free water may be present. The maximum water requirement may be on the order of about 2.5 to about 10 times the $WR_{Blend}$ in some applications.

The relationship between $WR_{Composition}$, $WR_{Blend}$, and $WR_{Max}$ is illustrated in Equation 8. Another constraint on an objective function may be that $WR_{Composition}$ must fall between the minimum water requirement, $WR_{Blend}$, and the maximum water requirement, $WR_{Max}$, to form a composition that is mixable and stable.

$$WR_{Blend} < WR_{Slurry} < WR_{Max} \quad (8)$$

Another way to express the mixability and stability criterion is in equation 9 where the maximum ($M_{max}$) and minimum ($M_{min}$) amounts of water are expressed in weight of water per weight of cement.

$$M_{min} < \frac{W}{\sum C_i WR_i} < M_{max} \quad (9)$$

The net specific property, Ccs of a cement slurry per unit volume may be described by equation 10 where Ccsi is mass fraction of each cementitious component in the cement slurry per unit weight.

$$Ccs = \frac{\sum m_i c_{csi}}{\sum \frac{c_{csi}}{\rho_i} + \frac{w}{\rho_w}} \quad (10)$$

Where mi is a specific property per unit weight of cement component i in the cement slurry, Ci is a mass fraction of cement component i in the cement slurry, ρi is a density of cement component i in the cement slurry, W is a mass of water per unit mass of cement components in the cement slurry, and ρi is a density of water. Examples of specific property per unit weight of cement component include, but are not limited to amount of crystalline silica, specific heat, thermal conductivity, heat content, amount of lime, amorphous silica, alumina, and iron, A method to produce a cement composition may be to minimize, maximize or ensure a particular value of equation 10 with the constraints of equations 1-9 or their any of their alternate forms. One of ordinary skill in the art, with the benefit of this disclosure, should be able to devise a constrained optimization process to minimize equation 10. Some suitable techniques may include, but are not limited to techniques using Lagrange multipliers, genetic algorithms, or Monte Carlo techniques, for example. Additionally, the optimization of equation 10 may be solves pictographically or graphically such as illustrated in FIG. 1. In order to provide optimization an objective function may be defined to minimize, maximize or achieve a value of a specific property. Objective functions may be any of the following:

Objective function for minimization: (Ccs (density of the slurry, i components)–0)$^2$ Objective function for maximization: 1/(Ccs(density of the slurry, i components)–0)$^2$ Objective function for obtaining a given value, v: (Ccs (density of the slurry, i components)–v)$^2$ Minimization should not be read to mean that any particular function reaches a local minimum but rather that using the techniques disclosed herein one of ordinary skill in the art to prepare a cement composition where an objective function is reduced as compared to a cement composition not prepared using the techniques described herein. For example, equation 10 may be used to design a cement with an absolute minimum net specific property, an absolute maximum net specific property, or any range therein. One of ordinary skill in the art, with the benefit of this disclosure, would be able to devise a constrained optimization process to minimize equation 10 to achieve any desired net specific property using the constrains described previously. Some suitable techniques for minimization may include, but are not limited to techniques using Lagrange multipliers, genetic algorithms, or Monte Carlo techniques, for example. Additionally, the optimization of equation 10 may be solved pictographically or graphically such as illustrated in FIG. 1.

Although only a few composition constraints have been discussed hereto, there may be other constraints that can be devised for a cement composition. For example, some cementitious materials may be highly reactive and cause gelling when included in certain quantities in cement slurries. In applications where highly reactive compounds are desired to be included in cement slurries, another constraint to include in an optimization model may be an upper and lower limit of the particular reactive cementitious material. Other design constraints may include limiting the amount of crystalline silica in the cement composition. The general form of a generic constraint may be expressed in equation 11 where $b_i$ and $a_i$ are numbers between 0 and 1.

$$b_i \leq C_i \leq a_i \quad (11)$$

Reactivity mapping may be used to estimate various mechanical properties of a cement component, including compressive strength, tensile strength, and Young's modulus. As previously described, correlations may be made between specific surface area and certain mechanical properties, such as reactivity, tensile strength, and Young's modulus. Using these correlations, the mechanical properties for a cement component or combination of cement components may be predicted. In some implementations of the embodiments described herein, cementitious materials and at least some of their corresponding properties may be stored in a material database. A material database may be any kind of database such as electronic, paper, or any combination thereof. A material database may include a plurality of inorganic particles, organic particles, cement additives, cement additives, or any cement component, collectively referred to "cementitious materials" and material properties for each of the plurality of cementitious materials, such as without limitation, a density for each of the plurality of the cementitious materials, a reactive index for each of the plurality of cementitious materials, and a water requirement of each of the plurality of cementitious materials. A material database may also include a material net specific property for each of the plurality of cementitious materials, amount of inorganic species such as $SiO_2$ and CaO in each of the plurality of cementitious materials, for example. The material database may be referenced or otherwise used when performing a minimization, maximization, or any other calculation associated with an objective function. In examples where an information system, such as a computer, is utilized to perform the methods described herein, the material database may be stored in electronic form and be accessible or otherwise available to the computer to query, read, and/or write to.

One technique that may be used to correlate material properties to a reactive index is modeling using a multilinear regression model. Without being limited by theory, the reactive index (α) of a cement component may be referred to as a measure of the cement component's reactivity as adjusted for differences in specific gravity, bulk density, water requirement, and amount of inorganic species such as SiO$_2$ and CaO. In an embodiment, a multilinear model of chemical reactive index for a particular material may be expressed as equation 13.

$$\text{reactive index} = \Sigma a_i p_i \quad (13)$$

Where $a_i$ is a constant and $p_i$ is a measurable physicochemical property. $P_i$ may be any of the following physicochemical properties such as without limitation, specific gravity, bulk density, water requirement, particle size, particle size distribution, Hausner ratio, particle shape parameters, aspect ratio of the particle, specific surface area, solubility in an alkaline media, oxide content such as silica, calcium oxide, alumina, iron oxide, manganese oxide, zinc oxide, and amorphous phase silica, for example. In a particular embodiment, a model of chemical reactive index may have the form of equation 14.

$$\alpha_i = a + b*SG + c*BD + d*WR + e*Si + f*Ca \quad (14)$$

Where a, b, c, d, e, and f are constants, SG is the specific gravity, BD is the bulk density, WR is water requirement, Si is the mass percentage of SiO$_2$, and Ca is the mass percentage of CaO.

In alternate embodiments, the model of chemical reactive index may have the form of equation 14, equation 15, or equation 16 where $a_i$ and $b_i$ are constants and $p_i$ is a measurable physicochemical property.

$$\text{reactive index} = \Sigma a_i p_i^{b_i} \quad (15)$$

$$\text{reactive index} = \Pi p_i^{a_i} \quad (16)$$

$$\text{reactive index} = \Sigma f(p_i) \quad (17)$$

A method of applying the reactive index model may include analyzing each of a group of inorganic particles to generate data about physicochemical properties of each of the inorganic particles and thereafter generating a correlation between a reactive index of each of the inorganic particles and the data. The correlation may then be used to design a cement composition based at least in part on the correlation. For example, the correlation may be used to select cement components and ratios thereof such that a cement composition including the selected cement components and ratios thereof has a desired reactivity. In an embodiment, a reactivity may be specified, and the model may be used to determine the required cement components and ratios thereof to achieve the desired reactivity.

Another method of applying a reactive index model may be to use a computer system and analytical instrument to gather physicochemical data about a group of inorganic particles. The computer system may then generate a correlation between a reactive index of each of the inorganic particles and the data and then output a cement composition based at least in part on the correlation. The cement composition may be subject to certain restraints such as compressive strength, for example. A user may enter a desired compressive strength and/or a list of inorganic particles into the computer system which may then use a correlation to generate a cement composition that meets the desired compressive strength. The cement composition may include one or more of the inorganic particles in the list of inorganic particles. In an embodiment, the computer system may include a predictive model database including multiple correlations wherein each correlation is specific to a particular inorganic particle.

One technique that may be used to correlate reactivity and specific surface area is the reactive index. surface area. It is important to note that the term "cement component" refers to any material that is cementitious when mixed with water and/or lime and a suspending agent, when necessary, such that the composition is stable. A "cementitious reactive index" CRI$_i$ can be defined as, but not limited to, equation 17 as follows:

$$CRI_i = f_{CRI}(CS_i, \rho_i, SSA_{PSDi}) \quad (17)$$

Where:
CS$_i$=Unconfined UCS (ultimate compressive strength) obtained from samples cured at specific reference temperature, pressure and age.
$\rho_i$=Density of composition that was prepared and cured for measuring UCS
SSA$_{PSDi}$=Specific surface area obtained by typical particle size analysis methods.

A "physicochemical index" (PCI) of the cementitious component may be defined as, but not limited to equation 18:

$$PCI_i = f_{PCI}(SA_i, SG_i, D_{50}, C_{Si}, C_{Ca}, C_{Al}, C_{Na}, C_{Fe}, C_{other\ species}) \quad (18)$$

Where:
SA$_i$=Surface area of the cementitious component i,
SG$_i$=specific gravity of the cementitious component i,
D$_{50}$=mass average or volume average diameter of the particle size distribution of cementitious component i,
C$_{Si}$=Mass concentration of silica oxide of component i,
C$_{Ca}$=Mass concentration of calcium oxide of component i,
C$_{Al}$=Mass concentration of Aluminum oxide of component i,
C$_{Na}$=Mass concentration of sodium oxide of component i,
C$_{Fe}$=Mass concentration of iron oxide of component i, It should be noted that the mass concentrations referenced above and here to for, may be measured, but is not limited to X-ray fluorescence spectroscopy measuring technique and a reference to "component i" is equivalent to "cementitious component i". The functions in Equations 17 and 18 that define Cri$_{ed}$ and PCI$_i$, when properly defined, the following universal relationship may hold for a wide range of cementitious materials such as, but not limited to, Portland cements; fly ash; other pozzolanic materials; other ashes; etc.

$$CRI_i = f_{CRI-PCI}(PCI_i) \quad (19)$$

In some examples, the form of equation 19 may be a power law, such as in equation 20.

$$CRI_i = A\{PCI_i\}^B \quad (20)$$

A and B are coefficients that may be unique the various species and sources of cementitious materials selected. Once the generalized function defined in equation 20 is defined for a given population or group of cementitious components, a linear or nonlinear summation relationship further defined below, may be used in conjunction with equation 21 to predict the unconfined compressive strength of various combinations of cementitious materials for specified composition densities, temperatures, pressures and curing age.

$$CRI_c = A\{PCI_c\}^B \quad (21)$$

Where,
CRI$_c$ is defined as the CRI for the unique combination of n cementitious components as the composite, and similarly
PCI$_c$ is defined as the Physicochemical Index for the composite.

A given composite with mass of m$_c$ is defined as:

$$m_c = f_i + f_{i+1} f_{i-2} + f_n \quad (22)$$

Where: $f_i$ is defined as the mass fraction of the cementitious component i, and n is the total number of independent cementitious components. Once the function is defined in equation 22, then the composite value of the physicochemical reactive index may be computed using equation 23 as follows:

$$PCI_c = f_1 PCI_1 + f_2 PCI_2 + f_3 PCI_3 + \ldots + f_n PCI_n \quad (23)$$

Where: $PCI_c$ is defined as the overall chemical reactive index for a blend of n number of uniquely independent cementitious components, $f_i$ is defined as the mass fraction of the cementitious component i, and n is the total number of independent cementitious components. Once $PCI_c$ has been determined for specific assumed blend of selected cementitious components, then the linear or non-linear summations (equations 24 and 25) are determined for the following terms:

$$\rho_c = f_1 \rho_1 + f_2 \rho_2 + f_3 \rho_3 + \ldots + f_n \rho_n \quad (24)$$

and, $$SSA_{PSDc} = f_1 SSA_{PSD1} = f_2 SSA_{PSD2} + f_3 SSA_{PSD3} + \ldots + f_n SSA_{PSDn} \quad (25)$$

$PCI_c$ may be used to compute the value of $CRI_c$ using either equation 20 or the more generalized form of equation 21 for the composite terms. Once $CRI_c$ is determined for the given composite blend, then the composite values of $\rho_c$ and $SSA_{PSDc}$ may be used along with equation 26 to predict the actual compressive strength of the composite blend, $CS_c$.

$$CRI_c = f_{CRI}(CS_c, \rho_c, SSA_{PSDc}) \quad (26)$$

Equations 17 through 26 may also be used for predicting other mechanical properties, including but not limited to, Young's Modulus. Additionally, it should be noted that even though a "linear summation" technique is presented in the previous development, that this disclosure also includes other methods such as the non-linear summation method presented in equation 27.

$$PCI_c = (1+f_1)^{a1} PCI_1 + (1+f_2)^{a2} PCI_2 + (1+f_3)^{a3} PCI_3 + \ldots + (1+f_n)^{an} PCI_n \quad (27)$$

Where: ai are exponents that are determined for a unique set of cementitious components.

The reactivity of a cement composition may be affected by wellbore temperature. If a wellbore has a relatively low temperature, a component having a relatively higher reactivity may be required to ensure that the cement composition develops adequate strength. In previous cement compositions, a chemical accelerator may have been used to enhance the reaction speed in a relatively lower temperature well. A cement composition including a relatively higher chemical reactive index component may not require an accelerator due to the high reactivity of the component. Cement compositions comprising a high reactivity component may not require an accelerator and therefore may have a lower overall complexity. If a wellbore has a relatively high temperature, the cement component may be selected to have a relatively lower reactivity. Selecting a lower reactivity may be advantageous when the high temperature of a wellbore may cause the cement composition to set too quickly. In previous cement compositions, a cement set retarder may have been used to reduce the reaction speed in a relatively higher temperature well. By selecting a relatively lower reactivity component, the cement set reaction may potentially be slowed without the use of a retarder. The Selecting an appropriate cement component based on reactivity may reduce the complexity of the cement composition by eliminating or reducing the need for accelerators and retarders. Furthermore, a combination of cement components may be blended to control the reactivity, for example by adding low, medium, and high reactivity cement components, a cement composition may be created that has a controlled reactivity along the spectrum of wellbore temperatures. One of ordinary skill in the art, with the benefit of this disclosure, would recognize the appropriate amount and type of cement component to include for a chosen application.

The cement compositions described herein may include water and at least one cement component. The cement compositions may have a density suitable for a particular application. The cement compositions may have any suitable density, including, but not limited to, in the range of about 8 pounds per gallon ("ppg") (959 kg/m$^3$) to about 20 ppg (2397 kg/m$^3$). The water used in the cement compositions may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the cement composition. The water may be included in an amount sufficient to form a pumpable composition. The water may be included in the cement compositions in any suitable range, including, but not limited to, in the range of about 40% to about 200% by weight of the cement component or components ("bwoc"). By weight of cement refers to the total weight of all cement components included in the cement composition. In some examples, the water may be included in an amount in the range of about 40% to about 150% bwoc.

The cement composition may include a hydraulic cement. A variety of hydraulic cements may be utilized in accordance with the present disclosure, including, but not limited to, those including calcium, aluminum, silicon, oxygen, iron, and/or sulfur, which set and harden by reaction with water. Suitable hydraulic cements may include Portland cements, gypsum, and calcium aluminate cements, among others. Portland cements may be classified as Classes A, C, G, and H cements according to American Petroleum Institute, API Specification for Materials and Testing for Well Cements, API Specification 10, Fifth Ed., Jul. 1, 1990. In addition, in some examples, cements suitable for use may be classified as ASTM Type I, II, or III. Where present, the hydraulic cement generally may be included in the cement compositions in an amount sufficient to provide the desired compressive strength and/or density. The hydraulic cement may be present in the cement compositions in any suitable amount, including, but not limited to, in the range of about 0% to about 99% bwoc. In some examples the hydraulic cement may be present in an amount ranging between any of and/or including any of about 1%, about 5%, about 10%, about 20%, about 40%, about 60%, about 80%, or about 90% bwoc. In addition, the cement compositions may also be designed that are free (or essentially free) of Portland cement. Those of ordinary skill in the art, with the benefit of this disclosure, would be able to select an appropriate amount of hydraulic cement for a particular application.

The cement composition may include a geopolymer cement, which may include an aluminosilicate source, a metal silicate source, and an activator. The geopolymer cement may react to form a geopolymer. A geopolymer is an inorganic polymer that forms long-range, covalently bonded, non-crystalline networks. Geopolymers may be formed by chemical dissolution and subsequent re-condensation of various aluminosilicates and silicates to form a 3D-network or three-dimensional mineral polymer. The activator for the geopolymer cement may include, but is not limited to, metal hydroxides, chloride salts such as KCl, CaCl$_2$, NaCl, carbonates such as Na$_2$CO$_3$, silicates such as sodium silicate, aluminates such as sodium aluminate, and ammonium hydroxide. The aluminosilicate source for the geopolymer cement may include any suitable aluminosilicate. Aluminosilicate is a mineral including aluminum, silicon, and oxygen, plus counter-cations. There are potentially hundreds of suitable minerals that may be an aluminosilicate source in that they may include aluminosilicate minerals. The metal silicate source may include any suitable metal silicate. A silicate is a compound containing an anionic silicon compound. Some examples of a silicate include the orthosilicate anion also known as silicon tetroxide anion, SiO$_4^{4-}$ as well as hexafluorosilicate [SiF$_6$]$^{2-}$. Other common silicates include cyclic and single chain silicates which may have the general formula [SiO$_{2+n}$]$^{2n-}$ and sheet-forming silicates ([SiO$_{2.5}$]$^-$)$_n$. Each silicate example may have one or more metal cations associated with each silicate molecule. Some suitable metal silicate sources and may include, without limitation, sodium silicate, magnesium silicate, and potassium silicate. Where present, the geopolymer cement generally may be included in the cement compositions in an amount sufficient to provide the desired compressive strength and/or density. The geopolymer cement may be present in the cement compositions in any suitable amount, including, but not limited to, an amount in the range of about 0% to about 99% bwoc. In some examples the geopolymer cement may be present in an amount ranging between any of and/or including any of about 1%, about 5%, about 10%, about 20%, about 40%, about 60%, about 80%, or about 90% bwoc. One of ordinary skill in the art, with the benefit of this disclosure, would be able to select an appropriate amount of geopolymer cement for a particular application.

The cement compositions may include a silica source. Silica may also be referred to as silicon dioxide (SiO$_2$). By inclusion of a silica source, a different path may be used to arrive at a similar product as from Portland cement. For example, a pozzolanic reaction may be induced wherein silicic acid (H$_4$SiO$_4$) and portlandite (Ca(OH)$_2$ react to form a cement product (calcium silicate hydrate). If other compounds, such as, aluminate, are present in the silica source, additional reactions may occur to form additional cement products, such as calcium aluminate hydrates. Additionally, alumina (aluminum oxide Al2O3) may be present in the silica source. Calcium hydroxide necessary for the reaction may be provide from other cement components, such as Portland cement, or may be separately added to the cement composition. Examples of suitable silica sources may include fly ash, slag, silica fume, crystalline silica, silica flour, cement kiln dust ("CKD"), metakaolin, diatomaceous earth, zeolite, shale, and agricultural waste ash (e.g., rice husk ash, sugar cane ash, and bagasse ash), among other. Where present, the silica source generally may be included in the cement compositions in an amount sufficient to provide the desired compressive strength and/or density. The silica source may be present in the cement compositions in any suitable amount, including, but not limited to an amount in the range of about 0% to about 99% bwoc. In some examples the silica source may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of silica source for a particular application.

The cement compositions may include fly ash. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash includes both silica and lime, so it may set to form a hardened mass upon mixing with water. Class F fly ash generally does not contain a sufficient amount of lime to induce a cementitious reaction, therefore, an additional source of calcium ions is necessary for a set-delayed cement composition including Class F fly ash. In some embodiments, lime may be mixed with Class F fly ash in an amount in the range of about 0.1% to about 100% by weight of the fly ash. In some instances, the lime may be hydrated lime. The fly ash may be present in the cement compositions in any suitable amount, including, but not limited to an amount in the range of about 0% to about 99% bwoc. In some examples the fly ash may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of fly ash for a particular application.

The cement compositions may include slag. Slag is generally a by-product in the production of various metals from their corresponding ores. By way of example, the production of cast iron can produce slag as a granulated, blast furnace by-product with the slag generally including the oxidized impurities found in iron ore. Slag generally does not contain sufficient basic material, so slag cement may be used that further may include a base to produce a settable composition that may react with water to set to form a hardened mass. Examples of suitable sources of bases include, but are not limited to, sodium hydroxide, sodium bicarbonate, sodium carbonate, lime, and combinations thereof. The slag may be present in the cement compositions in any suitable amount, including, but not limited to an amount in the range of about 0% to about 99% bwoc. In some examples the slag may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of slag for a particular application.

The cement compositions may include cement kin dust or "CKD." CKD refers to a partially calcined kiln feed which is removed from the gas stream and collected, for example, in a dust collector during the manufacture of cement. Usually, large quantities of CKD are collected in the production of cement that are commonly disposed of as waste. The CKD may be present in the cement compositions in any suitable amount, including, but not limited to an amount in the range of about 0% to about 99% bwoc. In some examples the CKD may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of CKD for a particular application.

The cement compositions may include natural glass. Certain natural glasses may exhibit cementitious properties, in that it may set and harden in the presence of hydrated lime and water. Natural glass may be present in the cement compositions in any suitable amount, including, but not limited to an amount in the range of about 0% to about 99% bwoc. In some examples the natural glass may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of silica source for a particular application.

Clays may be included in the cement compositions. Some clays may include shale or metakaolin. Among other things, clays included in the cement compositions may react with excess lime to form a suitable cementing material, for example, calcium silicate hydrate. A variety of clays are suitable, including those including silicon, aluminum, calcium, and/or magnesium. An example of a suitable shale includes vitrified shale. Zeolites may also be included in the cement compositions. Zeolites generally are porous alumino-silicate minerals that may be either a natural or synthetic material. Synthetic zeolites are based on the same type of structural cell as natural zeolites and may include aluminosilicate hydrates. As used herein, the term "zeolite" refers to all natural and synthetic forms of zeolite. Examples of zeolites may include, without limitation, mordenite, zsm-5, zeolite x, zeolite y, zeolite a, etc. Furthermore, examples including zeolite may include zeolite in combination with a cation such as $Na^+$, $K^+$, $Ca^{2+}$, $Mg^{2+}$, etc. Zeolites including cations such as sodium may also provide additional cation sources to the cement composition as the zeolites dissolve. The clays and zeolites may be present in the cement compositions in any suitable amount, including, but not limited to an amount in the range of about 0% to about 99% bwoc. In some examples the clays and zeolites may be present in an amount ranging between any of and/or including any of about 1%, about 5%, about 10%, about 20%, about 40%, about 60%, about 80%, or about 90% bwoc. Those of ordinary skill in the art, with the benefit of this disclosure, would be able to select an appropriate amount of clays and/or zeolite for a particular application.

The cement compositions may further include hydrated lime or calcium hydroxide. In some examples, the hydrated lime may be provided as quicklime (calcium oxide) which hydrates when mixed with water to form the hydrated lime. The hydrated lime may be included in examples of the cement compositions. Where present, the hydrated lime may be included in the cement compositions in an amount in the range of from about 10% to about 100% by weight of the silica source, for example. In some examples, the hydrated lime may be present in an amount ranging between any of and/or including any of about 10%, about 20%, about 40%, about 60%, about 80%, or about 100% by weight of the silica source. One of ordinary skill in the art, with the benefit of this disclosure, would recognize the appropriate amount of hydrated lime to include for a chosen application.

In some examples, the cement compositions may include a calcium source other than hydrated lime. In general, calcium and a high pH, for example a pH of 7.0 or greater, may be needed for certain cementitious reactions to occur. A potential advantage of hydrated lime may be that calcium ions and hydroxide ions are supplied in the same molecule. In another example, the calcium source may be Ca $(NO_3)_2$ or $CaCl_2$ with the hydroxide being supplied form NaOH or KOH, for example. One of ordinary skill would understand the alternate calcium source and hydroxide source may be included in a cement composition in the same way as hydrated lime. For example, the calcium source and hydroxide source may be included in a silica source-to-hydrated-lime weight ratio of about 10:1 to about 1:1 or a ratio of about 3:1 to about 5:1. Where present, the alternate calcium source and hydroxide source may be included in the cement compositions in an amount in the range of from about 10% to about 100% by weight of the silica source, for example. In some examples, the alternate calcium source and hydroxide source may be present in an amount ranging between any of and/or including any of about 10%, about 20%, about 40%, about 60%, about 80%, or about 100% by weight of the silica source. One of ordinary skill in the art, with the benefit of this disclosure, would recognize the appropriate amount of alternate calcium source and hydroxide source to include for a chosen application.

The cement compositions may include cement additives that may impart desirable properties to the cementing composition. Examples of such additives include, but are not limited to: weighting agents, retarders, accelerators, activators, gas control additives, lightweight additives, gas-generating additives, mechanical-property-enhancing additives, lost-circulation materials, filtration-control additives, fluid-loss-control additives, defoaming agents, foaming agents, dispersants, thixotropic additives, suspending agents, and combinations thereof. One of ordinary skill in the art, with the benefit of this disclosure, would be able to select an appropriate additive for a particular application.

The cement compositions disclosed herein may be used in a variety of subterranean applications, including primary and remedial cementing. The cement compositions may be introduced into a subterranean formation and allowed to set. In primary cementing applications, for example, the cement compositions may be introduced into the annular space between a conduit located in a wellbore and the walls of the wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore. In remedial cementing applications, the cement compositions may be used, for example, in squeeze cementing operations or in the placement of cement plugs. By way of example, the cement compositions may be placed in a wellbore to plug an opening (e.g., a void or crack) in the formation, in a gravel pack, in the conduit, in the cement sheath, and/or between the cement sheath and the conduit (e.g., a micro annulus).

Figure 3:
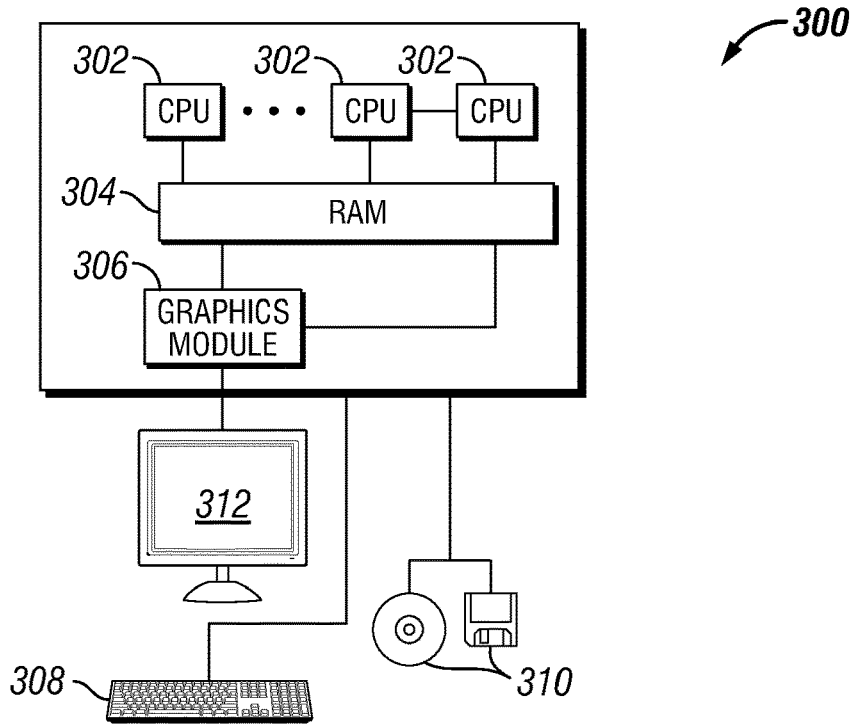
FIG. 3 is a schematic illustration of an example of an information handling system.

FIG. 3 generally illustrates an example of an information handling system 300 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 300 may be a personal computer, a network storage device, or any other suitable device and may vary in size, shape, performance, functionality, and price. In examples, information handling system 300 may be referred to as a supercomputer or a graphics supercomputer.

As illustrated, information handling system 300 may include one or more central processing units (CPU) or processors 302. Information handling system 300 may also include a random-access memory (RAM) 304 that may be accessed by processors 302. It should be noted information handling system 300 may further include hardware or software logic, ROM, and/or any other type of nonvolatile memory. Information handling system 300 may include one or more graphics modules 306 that may access RAM 704. Graphics modules 306 may execute the functions carried out by a Graphics Processing Module (not illustrated), using hardware (such as specialized graphics processors) or a combination of hardware and software. A user input device 308 may allow a user to control and input information to information handling system 300. Additional components of the information handling system 300 may include one or more disk drives, output devices 312, such as a video display, and one or more network ports for communication with external devices as well as a user input device 308 (e.g., keyboard, mouse, etc.). Information handling system 300 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media 310 such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 4:
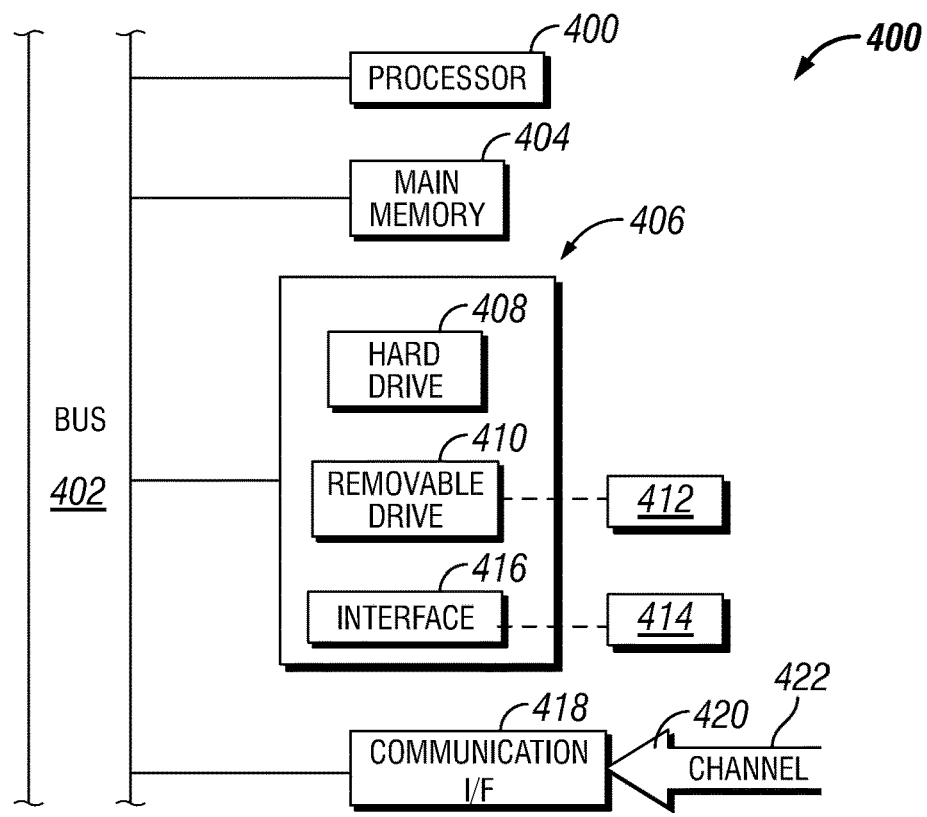
FIG. 4 illustrates additional detail of an information handling system.

FIG. 4 illustrates additional detail of information handling system 300. For example, information handling system 300 may include one or more processors, such as processor 400. Processor 400 may be connected to a communication bus 402. Various software embodiments are described in terms of this exemplary computer system. After reading this description, it will become apparent to a person skilled in the relevant art how to implement the example embodiments using other computer systems and/or computer architectures.

Information handling system 300 may also include a main memory 404, preferably random-access memory (RAM), and may also include a secondary memory 406. Secondary memory 406 may include, for example, a hard disk drive 408 and/or a removable storage drive 410, representing a floppy disk drive, a magnetic tape drive, an optical disk drive, etc. Removable storage drive 410 may read from and/or writes to a removable storage unit 412 in any suitable manner. Removable storage unit 412, represents a floppy disk, magnetic tape, optical disk, etc. which is read by and written to by removable storage drive 410. As will be appreciated, removable storage unit 412 includes a computer usable storage medium having stored therein computer software and/or data.

In alternative embodiments, secondary memory 406 may include other operations for allowing computer programs or other instructions to be loaded into information handling system 300. For example, a removable storage unit 414 and an interface 416. Examples of such may include a program cartridge and cartridge interface (such as that found in video game devices), a removable memory chip (such as an EPROM, or PROM) and associated socket, and other removable storage units 414 and interfaces 416 which may allow software and data to be transferred from removable storage unit 414 to information handling system 300.

In examples, information handling system 300 may also include a communications interface 418. Communications interface 418 may allow software and data to be transferred between information handling system 300 and external devices. Examples of communications interface 418 may include a modem, a network interface (such as an Ethernet card), a communications port, a PCMCIA slot and card, etc. Software and data transferred via communications interface 418 are in the form of signals 420 that may be electronic, electromagnetic, optical or other signals capable of being received by communications interface 418. Signals 420 may be provided to communications interface via a channel 422. Channel 422 carries signals 420 and may be implemented using wire or cable, fiber optics, a phone line, a cellular phone link, an RF link and/or any other suitable communications channels. For example, information handling system 300 includes at least one memory 404 operable to store computer-executable instructions, at least one communications interface 402, 418 to access the at least one memory 404; and at least one processor 400 configured to access the at least one memory 404 via the at least one communications interface 402, 418 and execute computer-executable instructions.

In this document, the terms "computer program medium" and "computer usable medium" are used to generally refer to media such as removable storage unit 412, a hard disk installed in hard disk drive 408, and signals 420. These computer program products may provide software to computer system 300.

Computer programs (also called computer control logic) may be stored in main memory 404 and/or secondary memory 406. Computer programs may also be received via communications interface 418. Such computer programs, when executed, enable information handling system 300 to perform the features of the example embodiments as discussed herein. In particular, the computer programs, when executed, enable processor 400 to perform the features of the example embodiments. Accordingly, such computer programs represent controllers of information handling system 300.

In examples with software implementation, the software may be stored in a computer program product and loaded into information handling system 300 using removable storage drive 410, hard disk drive 408 or communications interface 418. The control logic (software), when executed by processor 400, causes processor 400 to perform the functions of the example embodiments as described herein.

In examples with hardware implementation, hardware components such as application specific integrated circuits (ASICs). Implementation of such a hardware state machine so as to perform the functions described herein will be apparent to persons skilled in the relevant art(s). It should be noted that the disclosure may be implemented at least partially on both hardware and software.

The methods described herein may be carried out, at least in part, using a computer system including a computer-accessible medium, the computer-accessible medium containing a computer program that causes a processor to execute instructions that carry out at least some of the method steps described herein. In general, a computer-accessible medium may include any tangible or non-transitory storage media or memory media such as electronic, magnetic, or optical media—e.g., disk or CD/DVD-ROM coupled to the computer. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM), flash memory, or other volatile memory types. Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The following statements may describe certain embodiments of the present disclosure but should not be read to be limiting to any particular embodiment.

Statement 1. A method of preparing a cement composition comprising: minimizing an objective function subject to a plurality of constraints to produce a cement composition comprising at least one cement component and water; and generating a cement composition based at least in part on the objective function; preparing the cement composition.

Statement 2. The method of statement 1 wherein the objective function has the form of:

$$C_{CS} = \frac{\sum m_i c_{csi}}{\sum \frac{c_{csi}}{\rho_i} + \frac{w}{\rho_w}}$$

Where mi is a specific property per unit weight of cement component i in the cement slurry, Ci is a mass fraction of cement component i in the cement slurry, $\rho i$ is a density of cement component i in the cement slurry, W is a mass of water per unit mass of cement components in the cement slurry, and $\rho i$ is a density of water.

Statement 3. The method of statements 1-2 wherein the step of minimizing an objective function is performed using a constrained optimization process.

Statement 4. The method of statements 1-3 wherein the step of minimizing an objective function is performed using a graphical method.

Statement 5. The method of statements 1-4 wherein the plurality of constraints is at least one of compressive strength, density, or mixability.

Statement 6. The method of statements 1-5 wherein one of the plurality of constraints is compressive strength and wherein the constraint has the $$CS = CS_0 \exp\left(-\frac{w}{c_{eff}}\right) \geq CS_{req}$$

where CS is compressive strength, $CS_0$ is compressive strength when a water to cement ratio is 1, $CS_{req}$ is a compressive strength requirement, and $c_{eff}$ is: $C_{eff} = \Sigma \alpha_i C_i$ where $\alpha_i$ is a reactive index of cement component i in the cement composition, $C_i$ is a mass fraction of cement component i in the cement composition, and $C_i$ is subject to the constraint of: $\Sigma C_i = 1$.

Statement 7. The method of statements 1-6 wherein the constraint is density and wherein the constraint has the form of $$\rho_{min} < \left(\rho = \frac{W + \sum C_i}{\frac{W}{\rho_w} + \sum \frac{C_i}{\rho_i}}\right) < \rho_{max}$$

where W is a mass of water per unit mass of cement components in the cement composition, $\rho_w$ is a density of water, $C_i$ is a mass fraction of cement component i in the cement composition, and $\rho_i$ is a density of cement component i in the cement composition.

Statement 8. The method of statements 1-7 wherein the constraint is mixability and wherein the constraint has the form of $$M_{min} < \frac{W}{WR_{Blend}} < M_{max}$$

where $M_{max}$ is a maximum amount of water in the cement composition, $M_{min}$ is a minimum amount of water in the cement composition, W is a mass of water per unit mass of cement components in the cement composition, and $WR_{blend}$ is a water requirement of the cement components in the cement composition.

Statement 9. The method of statements 1-8 wherein the water requirement of the cement components is a linear combination in the form of: $WR_{Blend} = \Sigma C_i WR_i$ where $C_i$ is a mass fraction of cement component i in the cement composition, and $WR_i$ is a water requirement of cement component i in the cement composition.

Statement 10. The method of statements 1-9 wherein the water requirement of the cement components is a non-linear combination in the form of: $WR_{Blend} = \Sigma (C_i WR_i)^{B_i}$ where $C_i$ is a mass fraction of cement component i in the cement composition, $WR_i$ is a water requirement of cement component i in the cement composition, and $B_i$ is a material constant for cement component i.

Statement 11. A system comprising: a material database comprising a plurality of cementitious materials and material properties for each of the plurality of cementitious materials, the material properties comprising a density for each of the plurality of the cementitious materials, a reactive index for each of the plurality of cementitious materials, and a water requirement of each of the plurality of cementitious materials; a computer system configured to: accept an input of compressive strength requirement and composition density requirement from a user; query the material database and return a cementitious material and the corresponding material properties for the cementitious material; generate a cement composition comprising at least one of the cementitious materials and water, wherein the step of generation is based at least in part on minimizing an objective function, the minimization being subject to a plurality of constraint functions; and displaying the composition to the user.

Statement 12. The system of statement 11 wherein the objective function has the form of:

$$C_{CS} = \frac{\sum m_i c_{csi}}{\sum \frac{c_{csi}}{\rho_i} + \frac{w}{\rho_w}}$$

where mi is a specific property per unit weight of cement component i in the cement slurry, Ci is a mass fraction of cement component i in the cement slurry, $\rho i$ is a density of cement component i in the cement slurry, W is a mass of water per unit mass of cement components in the cement slurry, and $\rho i$ is a density of water.

Statement 13. The system of any of statements 11-12 wherein the step of minimizing an objective function is performed using a constrained optimization process.

Statement 14. The system of any of statements 11-13 wherein the constraint functions are functions which use at least one of a density for each of the plurality of the cementitious materials, a reactive index for each of the plurality of cementitious materials, and a water requirement of each of the plurality of cementitious materials Statement 15. The system of any of statements 11-14 wherein the plurality of constraint functions comprises a function of the form:

$$CS = CS_0 \exp\left(-\frac{w}{c_{eff}}\right) \geq CS_{req}$$

where CS is compressive strength, $CS_0$ is compressive strength when a water to cement ratio is 1, $CS_{req}$ is the compressive strength requirement, and $c_{eff}$ is: $C_{eff} = \Sigma \alpha_i C_i$ where $\alpha_i$ is a reactive index of cementitious material i in the cement composition, $C_i$ is a mass fraction of cementitious material i in the cement composition, and $C_i$ is subject to the constraint of: $\Sigma C_i = 1$.

Statement 16. The system of any of statements 11-15 wherein the plurality of constraint functions comprises a function of the form:

$$\rho_{min} < \left(\rho = \frac{W + \sum C_i}{\frac{W}{\rho_w} + \sum \frac{C_i}{\rho_i}}\right) < \rho_{max}$$

where W is a mass of water per unit mass of cementitious materials in the cement composition, $\rho_w$ is a density of water, $C_i$ is a mass fraction of cementitious material i in the cement composition, and $\rho_i$ is a density of cementitious material i in the cement composition.

Statement 17. The system of any of statements 11-16 wherein the plurality of constraint functions comprises a function of the form:

$$M_{min} < \frac{W}{WR_{Blend}} < M_{max}$$

where $M_{max}$ is a maximum amount of water in the cement composition, $M_{min}$ is a minimum amount of water in the cement composition, W is a mass of water per unit mass of cementitious materials in the cement composition, and $WR_{blend}$ is a water requirement of the cementitious material in the cement composition.

Statement 18. The system of any of statements 11-17 wherein the water requirement of the cementitious material is a linear combination in the form of: $WR_{Blend} = \Sigma C_i WR_i$ where $C_i$ is a mass fraction of cementitious material i in the cement composition, and $WR_i$ is a water requirement of cementitious material i in the cement composition.

Statement 19. The system of any of statements 11-18 wherein the water requirement of the cementitious material is a linear combination in the form of: $WR_{Blend} = \Sigma (C_i WR_i)^{B_i}$ where $C_i$ is a mass fraction of cementitious material i in the cement composition, $WR_i$ is a water requirement of cementitious material i in the cement composition, and $B_i$ is a material constant for cementitious material i.

Statement 20. A non-transitory computer readable medium having data stored therein representing software executable by a computer, the software including instructions comprising: instructions to accept an input of compressive strength requirement and composition density; instructions to generate a cement composition comprising at least one cementitious material and water, the instructions to generate the cement composition comprising: instructions to query a material database and return one or more cementitious materials and a corresponding material property for each of the one or more cementitious materials, the material property being at least one of a density, a reactive index, or a water requirement; instructions to minimize an objective function, the objective function being subject to a plurality of constraint functions, the constraint functions being at least one of composition density or compressive strength requirement.

Example

The following example will illustrate the methods described herein in the design of a cement slurry. Table 1 illustrates the cementitious materials available to blend in the cement slurry as well as a specific property per pound of cementitious material, the water requirement in percent water per pound of cementitious material, specific gravity of the cementitious material, and reactivity of the cementitious material. The Units/lb depend on the specific property being considered. For crystalline silica, total amorphous silica, lime, alumina and iron content it is % by wt., crystalline silica/lb., Units/lb for other specific property such as specific heat, thermal conductivity, heat content may be similarly defined

TABLE 1

| Material | Units/lb | WR | BD | SG | Alpha |
| --- | --- | --- | --- | --- | --- |
| Class A Portland | 0.04 | 35 | 80.2 | 3.24 | 1 |
| Natural glass | 0.1885 | 79 | 42.12 | 2.4 | 1.2 |
| Fly Ash | 0.012 | 61 | 31.4 | 2.86 | 1.5 |
| Silica Powder | 0.31 | 34 | 18 | 2.31 | 2 |
| Class G Portland | 0.04 | 34 | 86.82 | 3.3 | 1 |
| Lightweight Additive | 0.4 | 108 | 27.9 | 0.83 | 2.3 |

For a given compressive strength requirement of 2400 psi (16,547 kPa) and a density requirement of 1.5 g/cm³ (12.5 pounds per gallon), the techniques described herein produce a slurry with the composition in Table 2.

TABLE 2

| Material | Mass Fraction |
| --- | --- |
| Class A Portland | 0.000 |
| Natural glass | 0.000 |
| Fly Ash | 0.909 |
| Silica Powder | 0.000 |
| Class G Portland | 0.000 |
| Lightweight Additive | 0.091 |

As is observed, the method produced a slurry with the least amount of the specific property was a bulk blend material of fly ash to constitute about 91% by mass of the cement slurry with no Portland cement in the blend. The optimized net specific property of the slurry comprised 14.5 units/bbl. However, additional design constraints may be imposed such as a minimum mass fraction of Portland cement to include in the cement composition. If a minimum mass fraction of 15% class A Portland cement is specified, the slurry may be calculated to have the composition illustrated in Table 3. The slurry of Table 3 has an optimized specific property of 18.46 units/bbl. In another example, the compressive strength requirement can be specified to be 3000 psi and the slurry may be calculated to have the composition illustrated in Table 4.

TABLE 3

| Material | Mass Fraction |
| --- | --- |
| Class A Portland | 0.150 |
| Natural glass | 0.000 |
| Fly Ash | 0.739 |
| Silica Powder | 0.000 |
| Class G Portland | 0.000 |
| Lightweight Additive | 0.111 |

TABLE 4

| Material | Mass Fraction |
| --- | --- |
| Class A Portland | 0.000 |
| Natural glass | 0.000 |
| Fly Ash | 0.3 |
| Silica Powder | 0.023 |
| Class G Portland | 0.032 |
| Lightweight Additive | 0.15 |

Reference is now made to FIG. 6, illustrating use of a cement composition 200. Cement composition 200 may include any of the components described herein. Cement composition 200 may be designed, for example, using reactivity mapping as described herein. Turning now to FIG. 6, the cement composition 200 may be placed into a subterranean formation 205 in accordance with example systems, methods and cement compositions. As illustrated, a wellbore 210 may be drilled into the subterranean formation 205. While wellbore 210 is shown extending generally vertically into the subterranean formation 205, the principles described herein are also applicable to wellbores that extend at an angle through the subterranean formation 205, such as horizontal and slanted wellbores. As illustrated, the wellbore 210 includes walls 215. In the illustration, a surface casing 220 has been inserted into the wellbore 210. The surface casing 220 may be cemented to the walls 215 of the wellbore 210 by cement sheath 225. In the illustration, one or more additional conduits (e.g., intermediate casing, production casing, liners, etc.), shown here as casing 230 may also be disposed in the wellbore 210. As illustrated, there is a wellbore annulus 235 formed between the casing 230 and the walls 215 of the wellbore 210 and/or the surface casing 220. One or more centralizers 240 may be attached to the casing 230, for example, to centralize the casing 230 in the wellbore 210 prior to and during the cementing operation.

With continued reference to FIG. 6, the cement composition 200 may be pumped down the interior of the casing 230. The cement composition 200 may be allowed to flow down the interior of the casing 230 through the casing shoe 245 at the bottom of the casing 230 and up around the casing 230 into the wellbore annulus 235. The cement composition 200 may be allowed to set in the wellbore annulus 235, for example, to form a cement sheath that supports and positions the casing 230 in the wellbore 210. While not illustrated, other techniques may also be utilized for introduction of the cement composition 200. By way of example, reverse circulation techniques may be used that include introducing the cement composition 200 into the subterranean formation 205 by way of the wellbore annulus 235 instead of through the casing 230. As it is introduced, the cement composition 200 may displace other fluids 250, such as drilling fluids and/or spacer fluids that may be present in the interior of the casing 230 and/or the wellbore annulus 235. While not illustrated, at least a portion of the displaced fluids 250 may exit the wellbore annulus 235 via a flow line and be deposited, for example, in one or more retention pits. A bottom plug 255 may be introduced into the wellbore 210 ahead of the cement composition 200, for example, to separate the cement composition 200 from the fluids 550 that may be inside the casing 230 prior to cementing. After the bottom plug 255 reaches the landing collar 280, a diaphragm or other suitable device should rupture to allow the cement composition 200 through the bottom plug 255. The bottom plug 255 is shown on the landing collar 280. In the illustration, a top plug 260 may be introduced into the wellbore 210 behind the cement composition 200. The top plug 260 may separate the cement composition 200 from a displacement fluid 265 and also push the cement composition 200 through the bottom plug 255.

The disclosed cement compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of preparing a cement composition comprising:
    minimizing an objective function subject to a plurality of constraints to produce a cement composition comprising at least one cement component and water, wherein the objective function is an equation to calculate a net specific property of a cement composition per unit volume from a specific property per unit weight of each cement component in the cement composition, a mass fraction of each cement component in the cement composition, a density of each cement component in the cement composition, a mass of water per unit mass of cement components in the cement composition, and a density of water;
    generating a cement composition based at least in part on the objective function; and
    preparing the cement composition.

2. The method of claim 1 wherein the objective function has the form of:

$$C_{CS} = \frac{\sum m_i c_{csi}}{\sum \frac{c_{csi}}{\rho_i} + \frac{w}{\rho_w}}$$

where Ccs is a net specific property of a cement slurry per unit volume, $m_i$ is a specific property per unit weight of cement component i in the cement slurry, $C_{csi}$ is a mass fraction of cement component i in the cement slurry, $\rho_i$ is a density of cement component i in the cement slurry, is a mass of water per unit mass of cement components in the cement slurry, and $\rho_w$ is a density of water.

3. The method of claim 1 wherein the step of minimizing an objective function is performed using a constrained optimization process.

4. The method of claim 1 wherein the step of minimizing an objective function is performed using a graphical method.

5. The method of claim 1 wherein the plurality of constraints is at least one of compressive strength, density, or mixability.

6. The method of claim 1 wherein one of the plurality of constraints is compressive strength and wherein the constraint has the form of:

$$CS = CS_0 \exp\left(-\frac{w}{c_{eff}}\right) \geq CS_{req}$$

where CS is compressive strength, $CS_0$ is compressive strength when a water to cement ratio is 1, $CS_{req}$ is a compressive strength requirement, and $c_{eff}$ is:

$$C_{eff} = \Sigma \alpha_i C_i$$

where $\alpha_i$ is a reactive index of cement component i in the cement composition, $C_i$ is a mass fraction of cement component i in the cement composition, and $C_i$ is subject to the constraint of: $\Sigma C_i = 1$.

7. The method of claim 1 wherein the constraint is density and wherein the constraint has the form of:

$$\rho_{min} < \left(\rho = \frac{W + \sum C_i}{\frac{W}{\rho_w} + \sum \frac{C_i}{\rho_i}}\right) < \rho_{max}$$

where W is a mass of water per unit mass of cement components in the cement composition, $\rho_w$ is a density of water, $C_i$ is a mass fraction of cement component i in the cement composition, and $\rho_i$ is a density of cement component i in the cement composition.

8. The method of claim 1 wherein the constraint is mixability and wherein the constraint has the form of:

$$M_{min} < \frac{W}{WR_{Blend}} < M_{max}$$

where $M_{max}$ is a maximum amount of water in the cement composition, $M_{min}$ is a minimum amount of water in the cement composition, W is a mass of water per unit mass of cement components in the cement composition, and $WR_{Blend}$ is a water requirement of the cement components in the cement composition.

9. The method of claim 8 wherein the water requirement of the cement components is a linear combination in the form of:

$$WR_{Blend} = \Sigma C_i WR_i$$

where $C_i$ is a mass fraction of cement component i in the cement composition, and $WR_i$ is a water requirement of cement component i in the cement composition.

10. The method of claim 8 wherein the water requirement of the cement components is a non-linear combination in the form of:

$$WR_{Blend} = \Sigma (C_i WR_i)^{B_i}$$

where $C_i$ is a mass fraction of cement component i in the cement composition, $WR_i$ is a water requirement of cement component i in the cement composition, and $B_i$ is a material constant for cement component i.

11. A system comprising:
    a material database comprising a plurality of cementitious materials and material properties for each of the plurality of cementitious materials, the material properties comprising a density for each of the plurality of the cementitious materials, a reactive index for each of the plurality of cementitious materials, and a water requirement of each of the plurality of cementitious materials;
    a computer system configured to:

accept an input of compressive strength requirement and composition density requirement from a user;

query the material database and return a cementitious material and the corresponding material properties for the cementitious material;

generate a cement composition comprising at least one of the cementitious materials and water, wherein the step of generation is based at least in part on minimizing an objective function, wherein the objective function is an equation to calculate a net specific property of a cement composition per unit volume from a specific property per unit weight of at least one cement component in the cement composition, a mass fraction of each cement component in the cement composition, a density of each cement component in the cement composition, a mass of water per unit mass of cement components in the cement composition, and a density of water, the minimization being subject to a plurality of constraint functions; and displaying the composition to the user.

12. The system of claim 11 wherein the objective function has the form of:

$$Ccs = \frac{\sum m_i c_{csi}}{\sum \frac{c_{csi}}{\rho_i} + \frac{w}{\rho_w}}$$

where Ccs is a net specific property of a cement slurry per unit volume, $m_i$ is a specific property per unit weight of cement component i in the cement slurry, $C_{csi}$ is a mass fraction of cement component i in the cement slurry, $\rho_i$ is a density of cement component i in the cement slurry, W is a mass of water per unit mass of cement components in the cement slurry, and $\rho_w$ is a density of water.

13. The system of claim 11 wherein the step of minimizing an objective function is performed using a constrained optimization process.

14. The system of claim 11 wherein the constraint functions are functions which use at least one of a density for each of the plurality of the cementitious materials, a reactive index for each of the plurality of cementitious materials, and a water requirement of each of the plurality of cementitious materials.

15. The system of claim 11 wherein the plurality of constraint functions comprises a function of the form:

$$CS = CS_0 \exp\left(-\frac{w}{c_{eff}}\right) \geq CS_{req}$$

where CS is compressive strength, $CS_0$ is compressive strength when a water to cement ratio is 1, $CS_{req}$ is the compressive strength requirement, and $c_{eff}$ is:

$$C_{eff} = \Sigma \alpha_i C_i$$

where $\alpha_i$ is a reactive index of cementitious material i in the cement composition, $C_i$ is a mass fraction of cementitious material i in the cement composition, and $C_i$ is subject to the constraint of: $\Sigma C_i = 1$.

16. The system of claim 11 wherein the plurality of constraint functions comprises a function of the form:

$$\rho_{min} < \left(\rho = \frac{W + \sum C_i}{\frac{W}{\rho_w} + \sum \frac{C_i}{\rho_i}}\right) < \rho_{max}$$

where W is a mass of water per unit mass of cementitious materials in the cement composition, $\rho_w$ is a density of water, $C_i$ is a mass fraction of cementitious material i in the cement composition, and $\rho_i$ is a density of cementitious material i in the cement composition.

17. The system of claim 11 wherein the plurality of constraint functions comprises a function of the form:

$$M_{min} < \frac{W}{WR_{Blend}} < M_{max}$$

where $M_{max}$ is a maximum amount of water in the cement composition, $M_{min}$ is a minimum amount of water in the cement composition, W is a mass of water per unit mass of cementitious materials in the cement composition, and $WR_{blend}$ is a water requirement of the cementitious material in the cement composition.

18. The system of claim 17 wherein the water requirement of the cementitious material is a linear combination in the form of:

$$WR_{mend} = \Sigma C_i WR_i$$

where $C_i$ is a mass fraction of cementitious material i in the cement composition, and $WR_i$ is a water requirement of cementitious material i in the cement composition.

19. The system of claim 17 wherein the water requirement of the cementitious material is a linear combination in the form of:

$$WR_{Blend} = \Sigma (C_i WR_i)^{B_i}$$

where $C_i$ is a mass fraction of cementitious material i in the cement composition, $WR_i$ is a water requirement of cementitious material i in the cement composition, and $B_i$ is a material constant for cementitious material i.

20. A non-transitory computer readable medium having data stored therein representing software executable by a computer, the software including instructions comprising:

instructions to accept an input of compressive strength requirement and composition density;

instructions to generate a cement composition comprising at least one cementitious material and water, the instructions to generate the cement composition comprising:

instructions to query a material database and return one or more cementitious materials and a corresponding material property for each of the one or more cementitious materials, the material property being at least one of a density, a reactive index, or a water requirement;

instructions to minimize an objective function, wherein the objective function is an equation to calculate a net specific property of a cement composition per unit volume from a specific property per unit weight of at least one cement component in the cement composition, a mass fraction of each cement component in the cement composition, a density of each cement component in the cement composition, a mass of water per unit mass of cement components in the cement composition, and a density of water, the objective function being subject to a plurality of constraint functions, the constraint functions being at least one of composition density or compressive strength requirement.

* * * * *